UNITED STATES PATENT OFFICE.

ZALMON A. TAYLOR, OF HAVERHILL, ASSIGNOR TO HIMSELF AND ALONZO P. B. KING, OF LAWRENCE, MASSACHUSETTS.

IMPROVEMENT IN COMPOSITIONS FOR DRESSING AND COLORING LEATHER.

Specification forming part of Letters Patent No. 116,886, dated July 11, 1871.

*To all whom it may concern:*

Be it known that I, ZALMON A. TAYLOR, of Haverhill, in the county of Essex and State of Massachusetts, have invented a new and useful or Improved Compound for Cleansing, Oiling, and Dyeing or Blacking Leather; and I do hereby declare the following to be a full, clear, and exact description thereof, with the ingredients and mode of compounding and using the same.

The ingredients composing the said compound are: Castile-soap, neat's-foot oil, or its equivalent, sal-soda, extract of logwood, and bichromate of potash. The proportions of the same, and which I have found, after a long series of experiments, to produce the best results, are as follows: Castile-soap, ten pounds; neat's-foot oil, ten ounces; sal-soda, ten ounces; extract of logwood, ten ounces; bichromate of potash, one ounce.

I do not limit my invention to these exact proportions, as I have combined the ingredients in somewhat different proportions with good effect.

In compounding the same I put the soap into a kettle over the fire, and add to the soap a sufficient amount of water to dissolve it. Next I add the sal-soda and the neat's-foot or other oil, and, lastly, the extract of logwood and the bichromate of potash. These I boil for about an hour, frequently stirring the same so as to thoroughly mix them.

The composition may have any desired consistency by simply varying the proportion of the sal-soda or the neat's-foot oil in accordance with the density required. If a greater hardness is sought, add a little more of the sal-soda. If less density is desired, increase the amount of oil. Thus it may be made into bars or be put up in cans, in accordance with the status determined on.

In using the said compound it may be applied to the leather by means of a brush, or in any other suitable manner.

I do not claim the compound as described in Letters Patent No. 94,897 or 97,857; nor that described in the rejected application of Geo. B. Hovey, filed December 30, 1868; nor that described in the rejected application of O. K. Tripp, filed February 12, 1869, as my invention differs from all these, in the employment of sal-soda, and a dye and mordant which, acting chemically, gives a fixed color to the whole mass.

Having described my invention, what I claim is as follows:

The manufacture or preparation of the above-described compound, of the ingredients and in the proportions substantially as and for the purposes hereinbefore explained.

ZALMON A. TAYLOR.

Witnesses:
F. P. HALE,
F. C. HALE.